(12) United States Patent
Sandgren et al.

(10) Patent No.: US 6,442,693 B1
(45) Date of Patent: Aug. 27, 2002

(54) METHOD AND SYSTEM FOR PROVIDING SECURE ONLINE COMMUNICATIONS BETWEEN REGISTERED PARTICIPANTS

(75) Inventors: Deborah Sandgren, Ambler, PA (US); Henrietta Hickman, Maple Shade, NJ (US)

(73) Assignee: GE Financial Assurance Holdings, Inc., Richmond, VA (US)

( * ) Notice: Subject to any disclaimer, the term of this patent is extended or adjusted under 35 U.S.C. 154(b) by 0 days.

(21) Appl. No.: 09/538,960

(22) Filed: Mar. 31, 2000

(51) Int. Cl.[7] .................. G06F 13/00; G06F 17/60; G06F 15/16
(52) U.S. Cl. .............. 713/200; 713/201; 713/202; 709/217; 709/219; 705/9
(58) Field of Search .............. 713/200, 201, 713/202; 340/172.5; 709/101, 200, 203, 219, 217; 705/9, 8, 1

(56) References Cited

U.S. PATENT DOCUMENTS

| | | | |
|---|---|---|---|
| 3,585,601 A | * | 6/1971 | Lahrson et al. ............. 395/671 |
| 5,862,346 A | | 1/1999 | Kley et al. |
| 5,960,406 A | | 9/1999 | Rasansky et al. |
| 6,026,433 A | * | 2/2000 | D'Arlach et al. .......... 709/217 |
| 6,038,597 A | | 3/2000 | Van Wyngarden |

OTHER PUBLICATIONS

PCT–International Search Report, dated Jul. 03, 2001, International Application No. PCT/US01/09377.
http://www.familybeat.com, pp. 1–3.
http://www.familystreet.com/default¯js.asp, pp. 1–3.
http://www.myfamily.com/front.asp, pp. 1–3.

* cited by examiner

Primary Examiner—Ly V. Hua
(74) Attorney, Agent, or Firm—Hunton & Williams

(57) ABSTRACT

The invention of the present application relates to method and system for implementing a secure private web site accessible to members only. The secure private web site has particular application with respect to interactive family communications. The secure private web site is created by a primary registrant, who designates additional subsequent registrants. The primary registrant can access all areas of the created secure private web site, whereas the subsequent registrants can access only a general access area. The general access area may comprise interactive communications features, gifting options, and consumer advisory services, among other features.

19 Claims, 6 Drawing Sheets

METHOD AND SYSTEM FOR PROVIDING SECURE ONLINE COMMUNICATIONS BETWEEN REGISTERED PARTICIPANTS

FIELD OF THE INVENTION

The invention of the present application relates to a method and system for providing private communications between a group of individuals, and in particular, to a method and system for promoting communication between family members.

BACKGROUND OF THE INVENTION

Various systems and methods have been proposed for keeping groups of individuals in interactive contact over a computer network.

One such system is proposed in U.S. Pat. No. 5,946,406 to Rasansky et al. Rasansky discloses a scheduling system for use between web users. Every end user is granted a password protected calendar. The calendar is provided in a web browser to obviate the need for users to purchase software programs. Users can send emails inviting others to participate in activities. A calendar is automatically created for those receiving the emails. The disclosure limits communication to the use of a scheduling calendar.

U.S. Pat. No. 5,862,346 to Kley et al. discloses a distributed group activity data network system and method. A server computer 104 maintains group activity files 124 that are accessed by client computer 102 through network connections 106.

U.S. Pat. No. 6,038,597 to Van Wyngarden discloses a method and apparatus for providing and accessing data at an Internet site. A web site 12 is provided including multi-access area 34 that has at least two levels of access associated with a user ID and password. A site provider at a first user point 14 publishes to web site 12 and a site user at a second user point 16 has access to both the site provider at the first user point 14 and the web site 12.

Existing Internet sites related to the field of the invention include www.myfamily.com, www.familystreet.com, and www.familybeat.com. All of these sites provide environments in which family members can share information. However, none of the sites provides secure communications along with a comprehensive set of interactive and advisory features.

SUMMARY OF THE INVENTION

It is, accordingly, an object of the present invention to provide a system and method for providing interactive online communication between a group of individuals within a secure environment, which overcomes the shortcomings of the prior art.

It is an additional object of the invention to provide a system and method for providing a secure interactive family web site with multiple access levels so that the web site creator has access to additional levels.

It is an additional object of the invention to create a secure private web site that functions as a comprehensive source of advisory information.

Additional objects and advantages of the invention will be set forth in the description which follows, or will be obvious from the description, or may be learned by practice of the invention.

To achieve the foregoing objects, and in accordance with the purposes of the invention as embodied and broadly described herein, a method for implementing a private web site accessible only to participating members is provided. The method comprises allowing a primary registrant to access a web server and create a private group web site. The method further comprises providing the primary registrant with access information so that the primary registrant can access the private group web site. The method also comprises supplying the primary registrant with an access mechanism to be implemented by one or more subsequent registrants, and granting access to the private group web site to the subsequent registrants upon activation of the access mechanism and selection of a user ID and a password. The method also comprises providing member functionality accessible to all registrants but inaccessible to the general public through a world wide web address and providing functionality accessible to only the primary registrant.

In a further aspect, the invention comprises a system for providing private communication between a plurality of registered members. The system comprises a host server, means for connecting the registered members with the host server, and a private web site residing on the host server. The private web site comprises an access mechanism for allowing access to the private web site by registered members and for preventing the site from being accessed by the public through a world wide web address. The private web site additionally comprises a registration mechanism for allowing one or more individuals having the access mechanism to register and become members of the private web site, an interactive communications interface for facilitating communications between the registered members, and a private web space accessible only to a primary registrant that created the family web site.

In an additional aspect, a system is provided for facilitating private communications between a plurality of registered family members. The system comprises a host server, means for connecting the registered family members with the host server; and a private family web site residing on the host server. The private family web site comprises an access mechanism for allowing access to the private family web site by the registered family members and for preventing the private family web site from being accessed directly by the public through a world wide web address. The private family web site additionally comprises a registration mechanism for allowing one or more individuals having the access mechanism to register and become members of the private family web site. The private family web site further comprises an interactive communications interface for facilitating communications between the registered family members, wherein the interactive communications interface comprises an interactive calendar on which group activities can be scheduled, a bulletin board for posting messages, an instant messaging feature, and real time games. The private family web site further comprises advisory services for advising the registered members of financial options and private web space accessible only to a primary registrant that created the private family web site.

The accompanying drawings, which are incorporated in and constitute a part of this specification, together with the description, serve to explain the principles of the invention.

DETAILED DESCRIPTION OF THE PREFERRED EMBODIMENT

Figure 1:
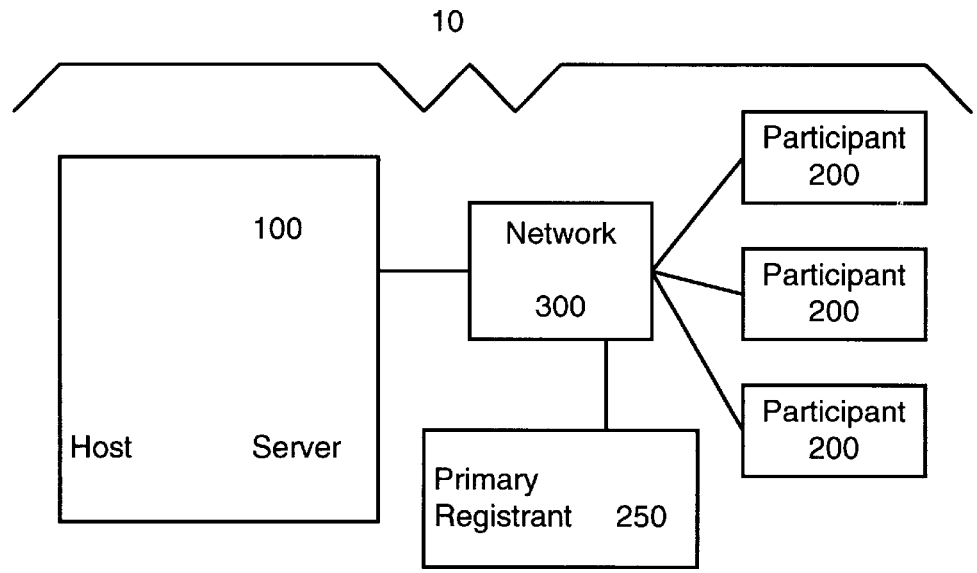
FIG. 1 is a block diagram illustrating a system for operation of a private web site of the invention.

Reference will now be made in detail to the present preferred embodiment of the invention, an example of which is illustrated in the accompanying drawings in which like reference numerals refer to corresponding elements.

FIG. 1 illustrates a system 10 for implementing the method of the invention. The system 10 links multiple participants 200 with a host server 100 over a network 300. A primary registrant 250 may create a private web site by interacting with host server 100 over network 300. Network 300 preferably comprises the Internet, which functions as a means for connecting the participants 200 and the primary registrant 250 with the host server 100. Each of the multiple participants 200 may access the host server 100 via a computer having an Internet connection. The participants 200 and the host server 100 are described in detail with reference to FIGS. 2a and 2b respectively.

Figure 2A:
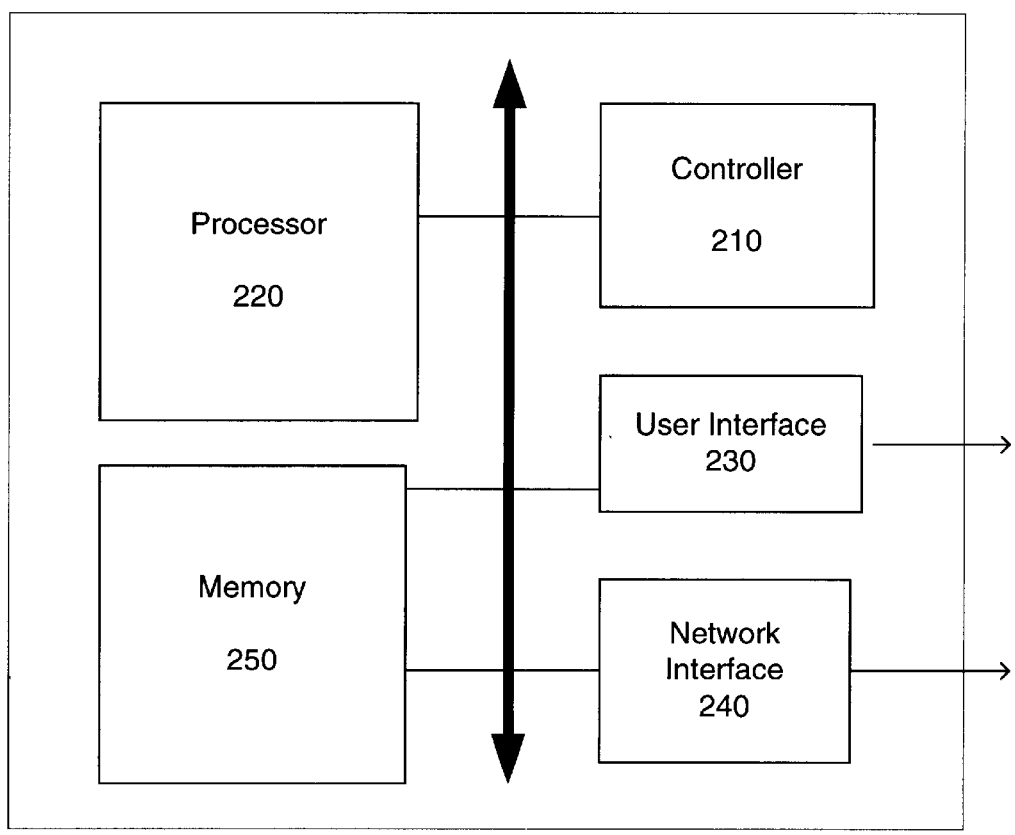
FIG. 2a is a block diagram illustrating an embodiment of a computer used by a registered participant of the private web site of the invention.

As shown in FIG. 2a, an embodiment of the computer used by a participant 200 includes a controller 210, a processor 220, a user interface 230, a network interface 240, and a memory 260. The primary registrant 250 preferably has access to an apparatus having similar components. The aforementioned components may be comprised of any standard computer components capable of performing the method described below with reference to FIGS. 4–6.

Figure 2B:
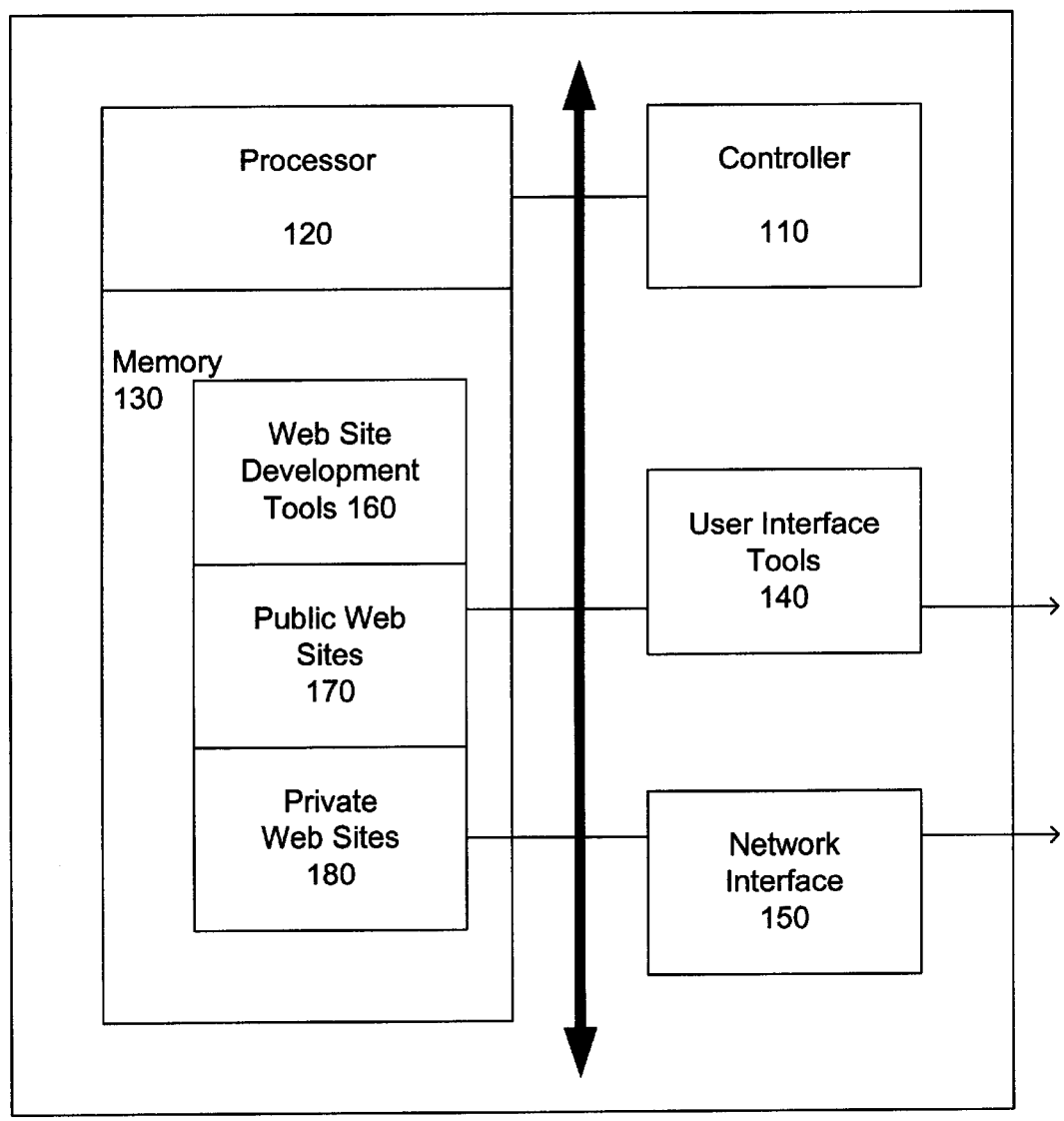
FIG. 2b is a block diagram illustrating en embodiment of the host server for operation of the private web site.

An embodiment of the host server 100 is shown in FIG. 2b. The host server 100 preferably includes a controller 110, a processor 120, a memory 130, a plurality of user interface tools 140, and a plurality of network interface tools 150. The controller 110 serves to regulate data flow between all of the aforementioned components. The network interface tools 150 link the host server 100 with the network 300. The user interface tools 140 may comprise any standard components that allow a service provider to access the host server 100. The processor 120 accesses a plurality of tools stored in the memory 130. The memory 130 comprises a plurality of web development tools 160, a plurality of publicly accessible public web sites 170, and a plurality of private web sites 180. As will be fully explained below, the private web sites 180 are created through accessing one of the public web sites 170 and utilizing the web site development tools 160 within the one public web site 170.

Figure 3:
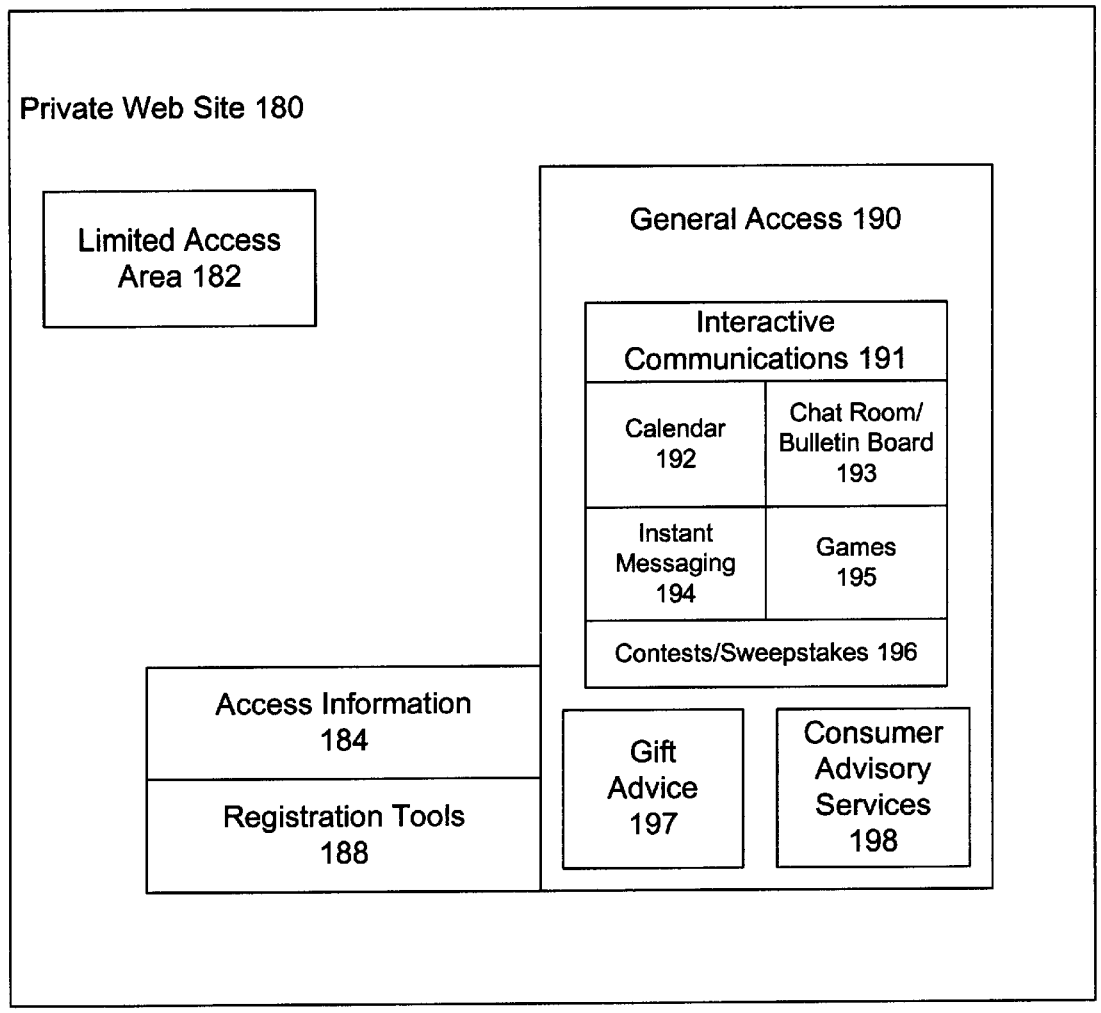
FIG. 3 is a block diagram illustrating an embodiment of the private web site of the invention.

An embodiment of a private web site 180 is shown in greater detail in FIG. 3. The private web site 180 comprises a general access area 190 and a limited access area 182. All of a plurality of features of the general access area 190 are available to all of the registered participants 200, whereas the contents of the limited access area 182 are available only to the primary registrant 250 (who created the private web site 180). The limited access area 182 is comprised of server space used to store personal information, such as a plurality of documents or forms that only the primary registrant 250 will be able to access. The primary registrant 250 will be able to download data or document files from the server space of the limited access area 182 for safekeeping and access them during sessions through limited access area 182. This feature is analogous to a hard drive on a personal computer and is intended to act as a secondary storage facility for the primary registrants 250. A suggested list of items to maintain on the private web site 180 will be provided as well as a disclaimer wherein the service provider may deny responsibility for maintenance of the private web site 180. Upon termination of the private web site 180, all information stored in the limited access area 182 will be deleted.

The general access area 190 comprises an area 191 for interactive communications features. The interactive communications area 191 preferably includes a calendar 192, a chat room and/or bulletin board 193, an instant messaging service 194, a plurality of games 195, and a contests/sweepstakes feature 196.

The calendar 192 can be reviewed, edited, amended, or modified by registered participants 200. Through the use of the calendar 192, group activities for various ones of the registered participants 200 can be easily scheduled.

The chat room and/or bulletin board 193 offer each one of the registered participants 200 the opportunity to communicate online with other ones of the registered participants 200 simultaneously. Through use of these features of the general access area 190, messages and important information can be posted and viewed on the private web site 180 by any of the registered participants 200.

The instant messaging service 194 operates similarly to a chat room, but communication between registered participants 200 occurs in real time. As soon as a registered participant 200 begins to enter data using the instant messaging service 194, the entered data appears on a screen of the computer of an intended recipient registered participant 200.

The games 195 are designed to allow one or more of the registered participants 200 to participate with another one or more of the registered participants 200 in common interactive games such as checkers, chess, backgammon, etc.

The contests/sweepstakes feature 196 allows each of the registered participants 200 to participate in one or more of a plurality of promotions and contests, exclusively provided for the registered participants 200 of the private web site 180.

In addition to the interactive communications area 191 in the general access area 190, the general access area 190 also includes a plurality of gift options 197 and a plurality of consumer advisory services 198.

The gift options 197 are provided to optimize tax savings for a registered participant 200. Including the gift options 197 in a private web site 180 for use by the registered participants 200 only is especially useful if the private web site 180 is a family web site. Accordingly, after receiving advice from the gift options area 197, each of the registered participant 200 family members would be able to interact with one or more of the other registered participant 200 family members in real time using the instant messaging service 194 to discuss the advantages, disadvantages, and feasibility of the provided gift options 197.

The consumer advisory services 198 are capable of providing information to the registered participants 200 pertaining to financial management, estate planning, retirement planning, wills, trusts, execution of estate and personal computer and Internet assistance. Again, such information is particularly useful in the context of a private web site 180, and has specific application to family type private web sites 180. Providing such consumer advisory services 198 in the context of a private web site 180 enables family members to share information that is relevant to the family situation in a confidential manner.

The consumer advisory services 198 may further include a plurality of links to a plurality of purchasing areas on other web sites so that the registered participants 200 will be able to make purchases of desired goods and services through accessing the private web site 180.

The private web site 180 may include additional features such as access information 184 and a plurality of registration tools 188. These additional features are included to ensure security for the private web site 180. The access information 184 ensures that only registered participants 200 are able to access the private web site 180 via such security means as using passwords and user IDs. The registration tools 184 assist in registering the registered participants 200 for access to the private web site 180 and maintaining the user features. The aforementioned additional security features could alternatively be maintained in other areas of the host server 100.

Figure 4:
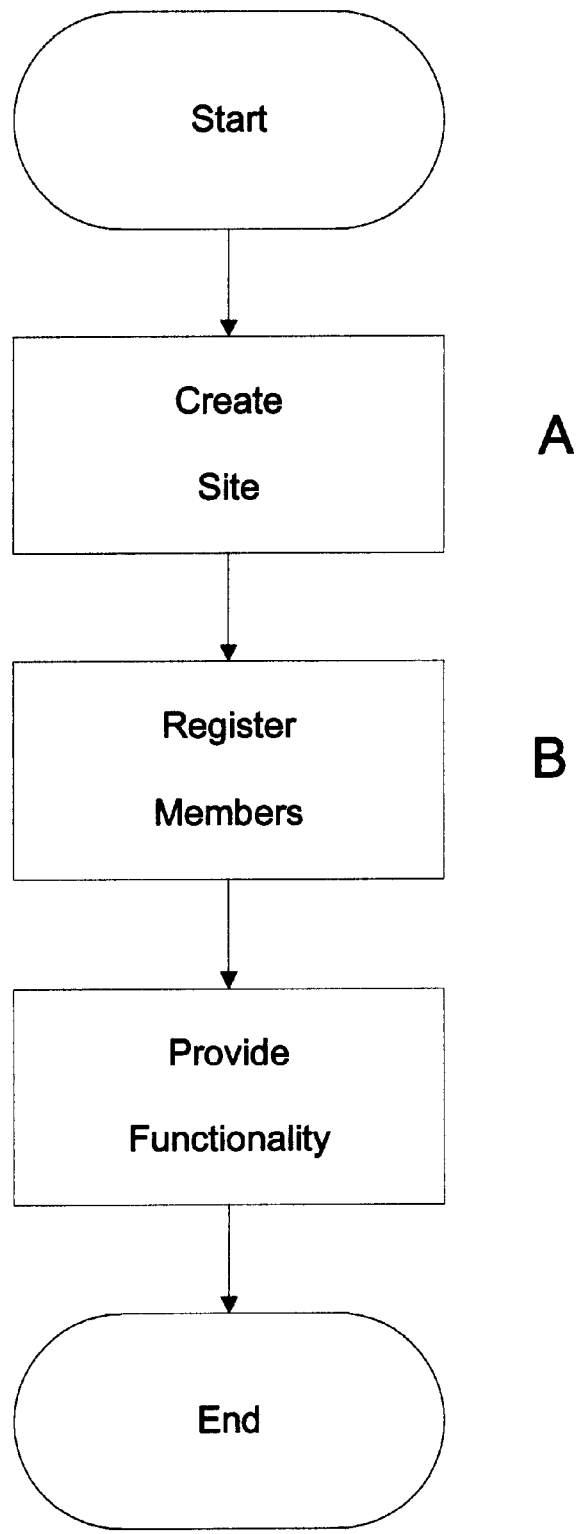
FIG. 4 is a flow chart illustrating the main procedures involved in implementing the system of the invention.

FIG. 4 illustrates the major procedures involved in implementing the private web site 180. In procedure A, the primary registrant 250 accesses the host server 100 via the network 300 and creates the private web site 180 by accessing and using the web site development tools 160. In step B, registration of one or more registered participant 200 members for use of the private web site 180 is accomplished, and finally in procedure C, functionality for the private web site 180 is provided. The steps involved in procedures A and B are further described in conjunction with FIGS. 5 and 6 below. Regarding procedure C, the functionality provided in the private web site 180 corresponds to one or more of the features described above with reference to FIG. 3.

Figure 5:
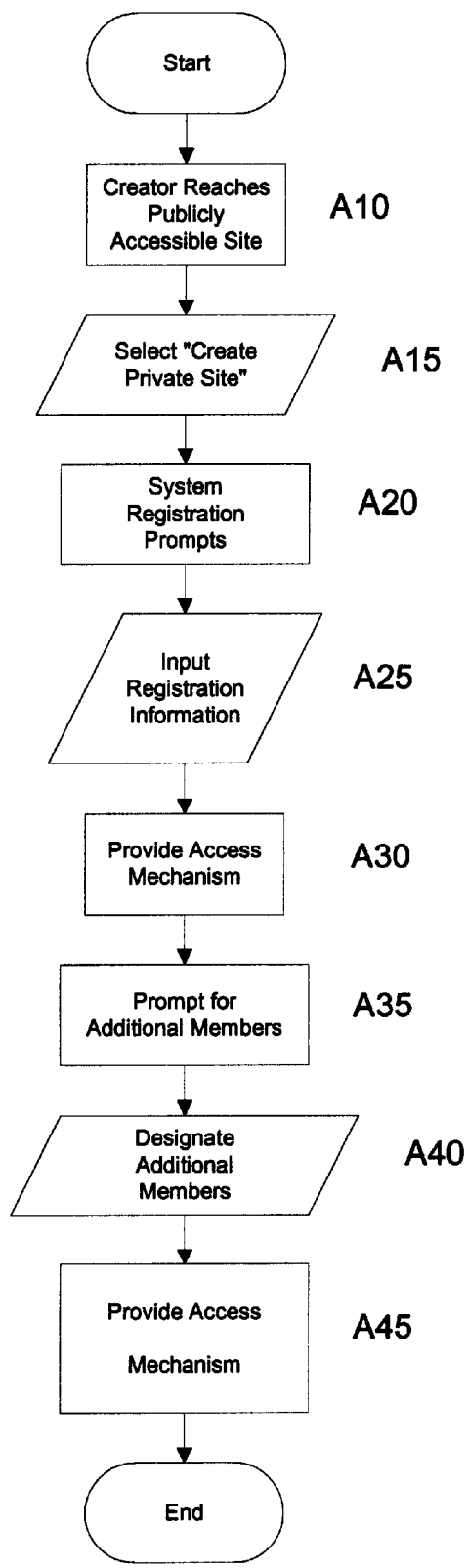
FIG. 5 is a flow chart illustrating the procedures involved in creating the private web site of the invention.

FIG. 5 is a flow chart illustrating the steps involved in procedure C of FIG. 4. In step A10, a private web site creator accesses a publicly accessible public web site 170 resident on a provider host server 100. The publicly accessible public web site 170 includes an option through which the private site creator can input an election to create a private web site 180. The host server 100 receives this input election in step A15. In step A20, the host server 100 provides registration prompts to the private web site creator. In response to such prompts, the private web site creator enters registration information requested by such prompts in step A25. In step A30, the host server 100 provides the private web site creator with an access mechanism for access to the private web site 180. In step A35, the host server 100 prompts the private web site creator for additional registered participant 200 member information. The private web site creator is thereby able to input information regarding additional registered participant 200 members in step A40. In step A45, the host server 100 provides an access mechanism for the additional registered participant 200 members to use to access the private web site 180. Upon creation of this private web site 180, the private web site creator has become the primary registrant 250 and can access the private web site 180 either through a user ID and a password or through an email access mechanism provided by the host server 100.

Figure 6:
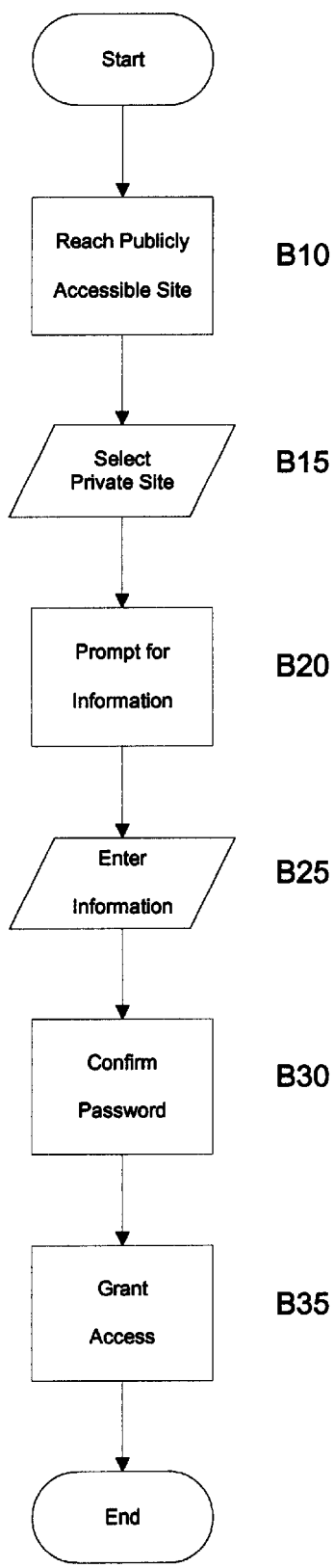
FIG. 6 is a flow chart illustrating steps involved in registration of members to the private web site of the invention.

FIG. 6 illustrates the steps involved in registration of subsequent registered participants 200. In step B10, a subsequent registered participant 200 accesses the publicly accessible public web site 170 on the host server 100. In step B15, the subsequent registered participant 200 accesses selects the private web site 180 that has already been created by the primary registrant 250. In step B20, the host server 100 prompts the subsequent registered participant 200 for registration information. In step B25, the subsequent registered participant 200 enters the prompted registration information, which preferably includes entry of a password that the subsequent registered participant 200 creates. In step B30, the host server 100 confirms the input password and, in step B35, the host server 100 grants access to the private web site 180 to the subsequent registered participant 200.

After the primary registrant 250 has created the private web site 180 and one or more subsequent registered participants 200 have been approved to access the private web site 180, all of the registered participants 200 and the primary registrant 250 are able to access the general access area 190 of the private web site 180. However, only the primary registrant 250 will be able to access the limited access area 182 of the private web site 180.

It will be apparent to those skilled in the art that various modifications and variations can be made in the system and method of the present invention without departing from the scope or spirit of the invention. Thus, it is intended that the present invention cover the modifications and variations of this invention provided they come within the scope of the appended claims and their equivalents.

What is claimed is:

1. A method for implementing a private web site accessible only to participating members, the method comprising the steps of:

allowing a primary registrant to access a web server and create a private group web site;

providing the primary registrant with access information so that the primary registrant can access the private group web site;

supplying the primary registrant with an access mechanism to be implemented by one or more subsequent registrants;

granting access to the private web site to the one or more subsequent registrants upon activation of the access mechanism and selection of a user ID and password;

providing member functionality accessible to all registrants in a general access area of the private web site but inaccessible to the general public through a world wide web address; and providing functionality in a limited access area of the private web site, wherein the functionality includes a predetermined amount of reserved server space for storing personal information accessible to only the primary registrant.

2. The method of claim 1, wherein the step of providing member functionality to all registrants comprises providing a calendar allowing the registrants to schedule activities.

3. The method of claim 1, wherein the step of providing member functionality to all registrants comprises providing a bulletin board on which the registrants can post messages.

4. The method of claim 1, wherein the step of providing member functionality to all registrants comprises providing instant messaging between two or more of the registrants.

5. The method of claim 1, wherein the step of providing member functionality to all registrants comprises providing real-time games through which the registrants can interact.

6. The method of claim 1, wherein the step of providing member functionality to all registrants comprises providing contests or sweepstakes.

7. The method of claim 1, wherein the step of providing member functionality to all registrants comprises providing consumer advisory services.

8. The method of claim 1, wherein the step of providing functionality to all registrants comprises providing advice regarding tax consequences of gift options.

9. The method of claim 1, wherein the step of providing functionality in the limited access area includes providing storage for at least one of documents and forms.

10. The method of claim 1, wherein the step of creating a private group web page comprises inputting registration data and selecting a user name and password.

11. A system for providing private communication between a plurality of registered members, the system comprising;
   a host server;
   means for connecting the registered members with the host server; and
   a private web site residing on the host server, the private web site comprising,
      an access mechanism for allowing access to the private web site and for preventing the private web site from being accessed by the public through a world wide web address,
      a registration mechanism for allowing one or more individuals having the access mechanism to register and become members of the private web site and to obtain a username and password to access the private web site,
      an interactive communications interface for facilitating communications between the registered members, and
      a private web space accessible only to a primary registrant that created the private web site, the private web space including a predetermined amount of reserved server space for storage of personal information.

12. The system of claim 11, wherein the interactive communications interface comprises a calendar for scheduling activities.

13. The system of claim 11, wherein the interactive communications interface comprises instant message delivery means.

14. The system of claim 11, wherein the interactive communications interface comprises a bulletin board on which all of the registered members can post messages.

15. The system of claim 11, wherein the interactive communications interface comprises a real time gaming system.

16. The system of claim 11, wherein the interactive communications interface comprises one or more contests or sweepstakes.

17. The system of claim 11, wherein the private web site further comprises one or more advisory services for providing the registered members with financial advice.

18. The system of claim 11, wherein the private web site further comprises gift option advice. for advising the registered members of tax consequences of various gift options.

19. A system for facilitating private communications between a plurality of registered family members, the system comprising;
   a host server;
   means for connecting the registered family members with the host server; and
   a private family web site residing on the host server, the private family web site comprising,
      an access mechanism for allowing access to the private family web site and for preventing the private family web site from being accessed directly by the public through a world wide web address,
      a registration mechanism for allowing one or more individuals having the access mechanism to register and become members of the private family web site and to obtain a username and password to access the private family web site,
      an interactive communications interface for facilitating communications between the registered family members, wherein the interactive communications interface comprises, an interactive calendar on which group activities can be scheduled, a bulletin board for posting messages, an instant messaging feature, and real time games,
      advisory services for advising the registered family members of financial options; and
   private web space accessible only to a primary registrant that created the private family web site, the private web space comprising a predetermined amount of reserved server space for storing personal information.

* * * * *